(12) United States Patent
Hoffmann

(10) Patent No.: US 6,255,751 B1
(45) Date of Patent: Jul. 3, 2001

(54) INTEGRATED ROTARY SERVO ACTUATOR

(75) Inventor: Benjamin Ralph Hoffmann, Minnetonka, MN (US)

(73) Assignee: Torex Corporation, Chanhassen, MN (US)

( * ) Notice: Subject to any disclaimer, the term of this patent is extended or adjusted under 35 U.S.C. 154(b) by 0 days.

(21) Appl. No.: 09/393,053

(22) Filed: Sep. 9, 1999

(51) Int. Cl.$^7$ .................................................. H02K 7/06
(52) U.S. Cl. ...................... 310/83; 310/40 MM; 475/149
(58) Field of Search ................................. 310/83, 90, 89, 310/75 R, 40 MM; 475/149, 331; 384/416

(56) References Cited

U.S. PATENT DOCUMENTS

| | | | |
|---|---|---|---|
| 3,774,477 | * 11/1973 | Murphy | 475/337 |
| 3,879,623 | * 4/1975 | Miyake | 310/83 |
| 3,897,843 | * 8/1975 | Hapeman et al. | 180/65.5 |
| 4,274,023 | * 6/1981 | Lamprey | 310/83 |
| 5,190,375 | * 3/1993 | Shiobara | 366/294 |
| 5,293,107 | * 3/1994 | Akeel | 318/568.11 |
| 5,382,854 | * 1/1995 | Kawamoto et al. | 310/67 R |
| 5,588,173 | * 12/1996 | Battlogg | 15/250.3 |
| 5,593,360 | * 1/1997 | Ishida et al. | 475/331 |
| 5,672,135 | * 9/1997 | Hamada | 475/149 |
| 5,777,412 | * 7/1998 | Yamamoto | 310/83 |
| 6,031,308 | * 2/2000 | Kinoshita et al. | 310/83 |

* cited by examiner

*Primary Examiner*—T Hoffman
*Assistant Examiner*—Joseph Waks
(74) *Attorney, Agent, or Firm*—Merchant & Gould P.C.

(57) ABSTRACT

A compact integrated servo motor and gear reducer assembly that includes a rotor having a rotor shaft and a stator, and a planetary gear system including a sun gear, a plurality of planet gears and an outer ring gear. First and second bearings support the planetary gear system. The first and second bearings are located on opposing sides of the planetary gear system, and the first bearing has a first diameter and the second bearing has a second diameter. A third bearing supports the rotor shaft, and the third bearing has a third diameter that is less than the first and second diameters. Moreover, the third bearing is positioned between an edge of the first bearing and an edge of the second bearing. The assembly can be used in applications requiring high torque output but yet with size and/or space limitations.

18 Claims, 15 Drawing Sheets

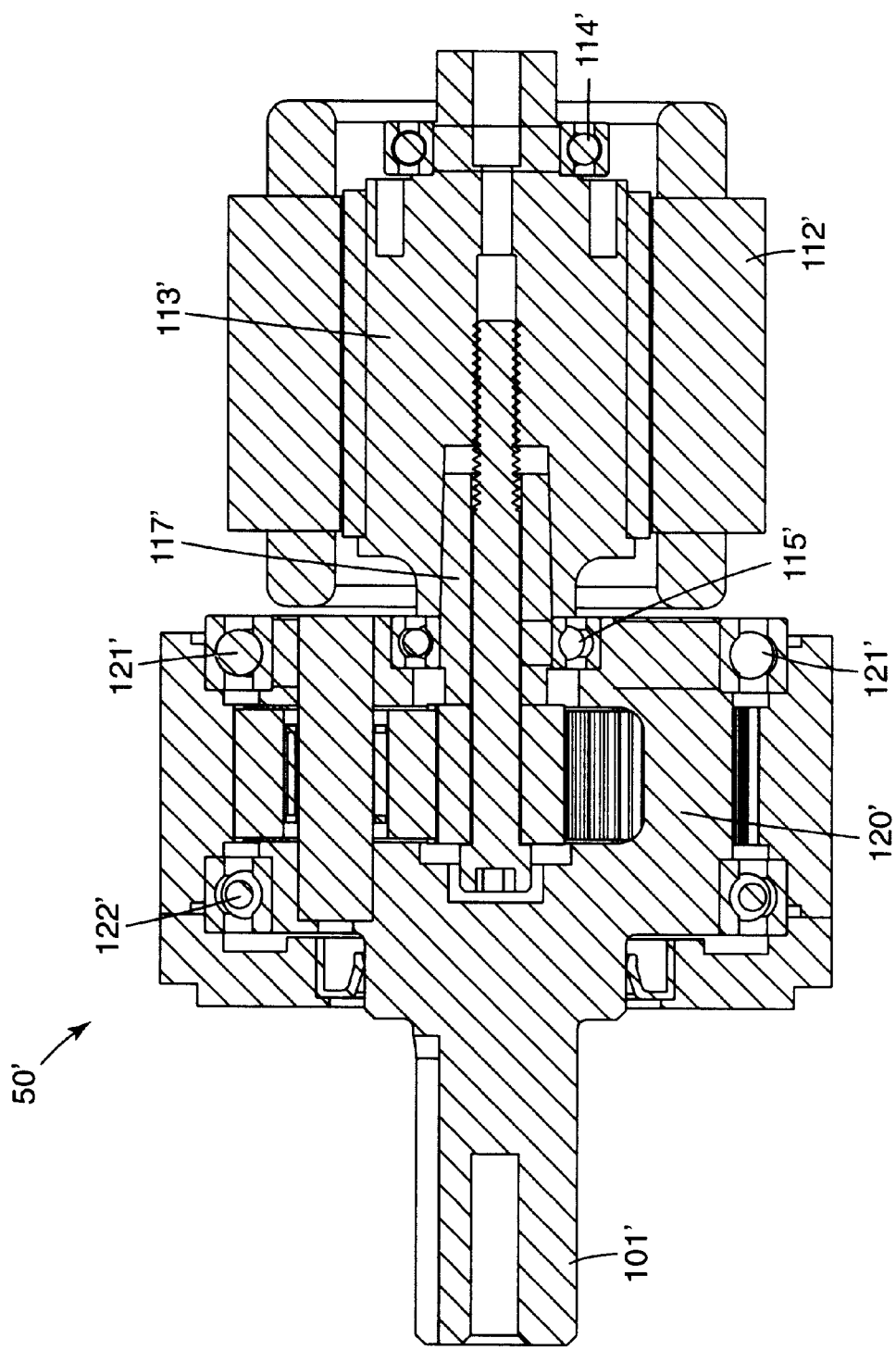

INTEGRATED ROTARY SERVO ACTUATOR

FIELD OF THE INVENTION

The present invention is generally directed to electric servo actuators and, more particularly, to a compact electric servo actuator having an integrated servo motor and gearhead assembly.

BACKGROUND

Electric servo actuators have many functions and are found in a variety of industrial applications. They are used to control positions, velocities or torques applied to various machine components. Typical applications include machine tools, packaging equipment as well as web processing equipment. Electric servo actuators are selected based upon the design parameters for a particular application. The design parameters that influence the selection process include the torque, rotational speed and power requirements. With respect to electric servo actuator design, it is well known in the art that power is proportional to the product of torque times rotational speed. Using this basic design principle, design engineers can modify the output torque from a servo motor by decreasing the servo motor's output rotational speed.

In practice, gear reducers are often used to convert the high rotational speed of servo motors into a higher torque, lower rotational output speed. Many types of gear reducers are available. One type of gear reducer is a planetary style reducer. This particular style of reducer uses a planetary arrangement of gears to apply a reduction ratio that is in an in-line (concentric) configuration. Planetary gear reducers are generally characterized by their small size, robustness, quiet operation, and low backlash. In typical applications, planetary gear reducers are made in modular form and are mounted to a standard servo motor to achieve the required speed reduction. FIG. 1 illustrates a typical design configuration having a servo motor 15 operably connected to a gear reducer 16. As shown in FIG. 1, adapter 17 is mounted to output shaft 18 of servo motor 15. Similarly, pinion 19 attaches to adapter 17 opposite servo motor 15. Gear reducer 16 receives as input pinion 19 and is selected to produce the desired output torque and rotational speed at shaft 20.

Conventional design configurations such as those exemplified in FIG. 1 have several shortcomings. For example, in situations where space and size are of concern, the addition of the components necessary to couple the servo motor with the gear reducer severely limits design options. Conventional configurations address this concern by using right angle gearheads and motors. However, this approach requires additional components and hence leads to a more expensive and heavier system.

Moreover, the conventional approach requires service personnel to manually couple the gear reducer to the servo motor. Often, this process requires special and proprietary mounting methods to fasten the gear reducer to the servo motor. Additionally, the process can result in improper installation or misalignment of the gear reducer with respect to the servo motor's output shaft. For example, if the modular gear reducer is not fastened to the servo motor properly, the strength of the pinion-shaft joint is weakened and can result in premature failure of the components.

Accordingly, there arises a need to provide for an electric servo actuator having substantially the same performance characteristics as a conventional motor and gearhead configuration but with the added feature of being very compact in relation to the conventional approach. Such an electric servo actuator and gearhead configuration would provide greater flexibility with respect to size and space considerations and substantially reduce installation and maintenance costs. The present invention addresses and overcomes the shortcomings of the prior art.

SUMMARY

The present invention generally provides a compact integrated servo motor and gear reducer assembly maintained within a unitary housing. The compact integrated servo motor and gear reducer assembly can be used in applications requiring high torque output but yet with size and/or space limitations. The present servo motor and gear reducer assembly may, for example, also reduce installation and maintenance costs associated with the operation of servo motors and gear reducer assemblies.

In a preferred embodiment of the invention, a servo motor and gear reducer are provided within a unitary housing. The servo motor is supported within the unitary housing at its distal end with bearings near the rear of the unitary housing. At its proximal end, the servo motor is supported with bearings and its output shaft is operatively connected directly to the gear reducer. In a preferred embodiment of the present invention, the gear reducer is a planetary gear system. Hence, the servo motor's output is operatively connected directly to the sun gear of the planetary gear system. In one embodiment, the servo motor rotor and the sun gear may be constructed as a unitary piece (or with the sun gear pressed onto a shaft area of a unitary piece). Furthermore, the bearings supporting the servo motor at its proximal end are contained substantially within and concentric with the planetary gear system. As a result of this configuration, the axial length of the overall assembly is reduced.

In operation, the servo motor rotates the input shaft of the planetary gear reducer, specifically, the sun gear. The output from the planetary gear system is transferred to a planet carrier. The planet carrier has a unitary design and is fully supported with a pair of bearings. As used herein, the term "fully supported" includes large diameter bearings on both sides (e.g., axially) of the planet gears. At least one prior design placed two bearings on the output shaft side of the gear system. However, this leads to planet gears which are supported in a cantilevered fashion. The present invention overcomes this shortcoming by placing bearings on either side of the planet/sun gear system. Also, as noted above, the sun gear bearing is placed axially within the planet carrier bearings.

Another feature of the present invention is that the bearings supporting the servo motor at its distal end are located axially within and concentric with the servo motor's windings. This feature of the present invention further contributes to the compactness of the overall assembly design.

As discussed above, the present invention provides for a compact integrated servo motor and gear reducer assembly contained within a unitary housing. Hence, all of the moving components, including the servo motor, planetary gear system, and support bearings, are contained within the unitary housing. In a preferred embodiment of the present invention, input and output ports are provided to allow for lubrication. As a result of this design, the moving parts of the of the present invention can be lubricated with a simple low pressure oil circulation system. Therefore, the integrated servo motor and gear reducer assembly of the present invention is capable of operating at increased power levels as compared to conventional servo motor and gear reducer assemblies.

Each of the identified features contribute toward a goal of optimizing the power density of the motor in view of cross-sectional constraints. This allows for embodiments, which are constructed in accordance with the principles of the present invention, offering a short axial length given power and diameter requirements.

Therefore, according to one aspect of the invention, there is provided an integrated rotary servo actuator apparatus, comprising: a rotor, having an output shaft; a stator; a planetary gear system, including a sun gear, a plurality of planet gears and an outer ring gear, wherein the sun gear is directly connected to said output shaft and a load shaft is connected to said planet gears; first and second bearings for supporting said planetary gear system, said first and second bearings located on opposing sides of said planetary gear system; and a third bearing for supporting said output shaft, wherein said third bearing is arranged and configured to be axially aligned within the area defined by and between said first and second bearings.

According to another aspect of the invention, there is provided a rotary servo actuator as recited in the preceding paragraph, wherein said stator includes a plurality of windings; and further comprising: a fourth bearing to support said rotor; said fourth bearing being arranged and configured to be axially aligned within said windings.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which like parts are identified by like reference numerals.

FIG. 6a is a cross section view of the integrated rotary servo actuator 50 of FIG. 5 taken through line 6a–6a;

FIG. 12 is a schematic cross sectional view of an alternative embodiment integrated rotary servo actuator;

FIG. 12a is a schematic cross sectional view of an alternative embodiment integrated rotary servo actuator;

FIG. 12b is a partially exploded view of the actuator of FIG. 12a;

Figure 1:
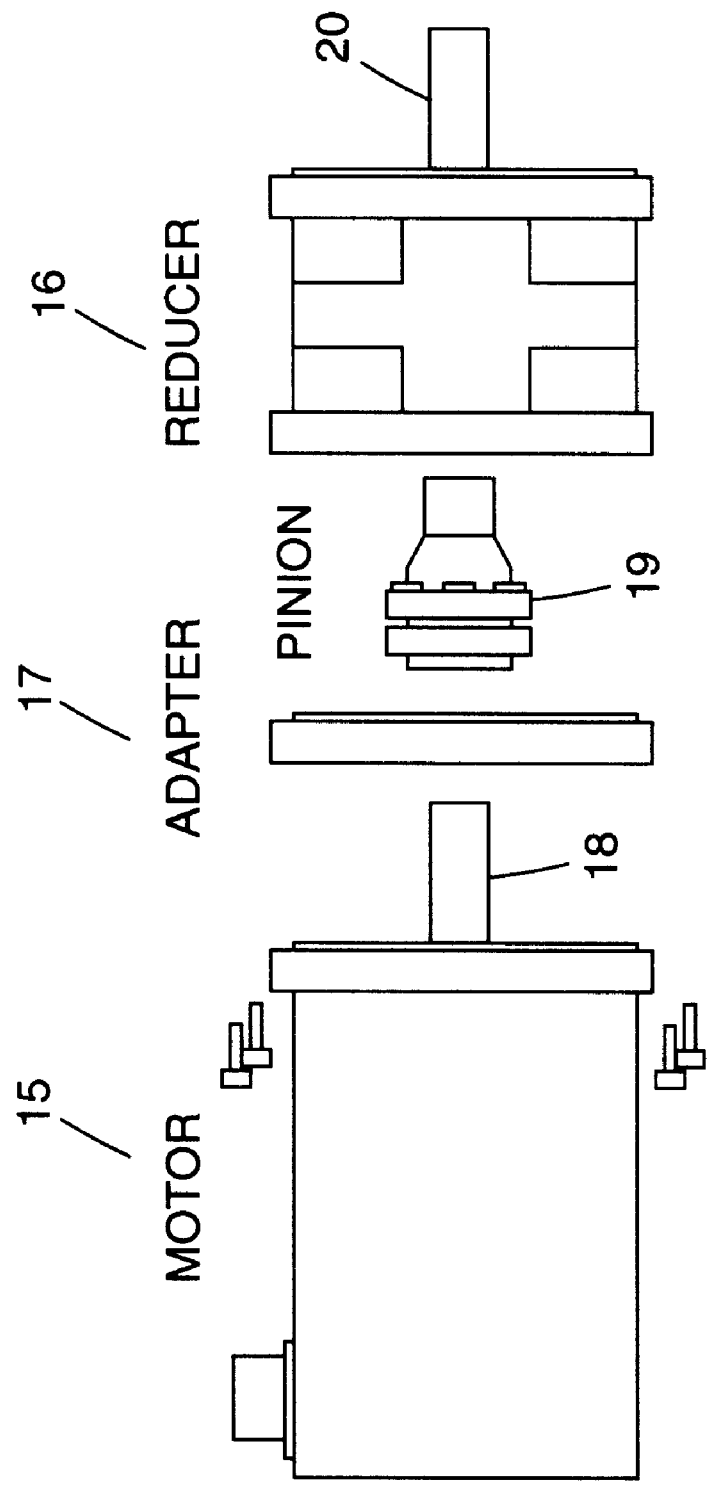
FIG. 1 illustrates a conventional configuration for prior art electric servo motors.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents and alternatives falling within the spirit and scope of the invention as defined by the appended claims.

DETAILED DESCRIPTION

The present invention is generally directed to electric servo actuators and in particular is directed to an electric servo actuator having an integrated servo motor and gear head assembly. While the present invention is not so limited, a more detailed understanding of the present invention will be gained through a discussion of the drawings in connection with the examples provided below.

Figure 2:
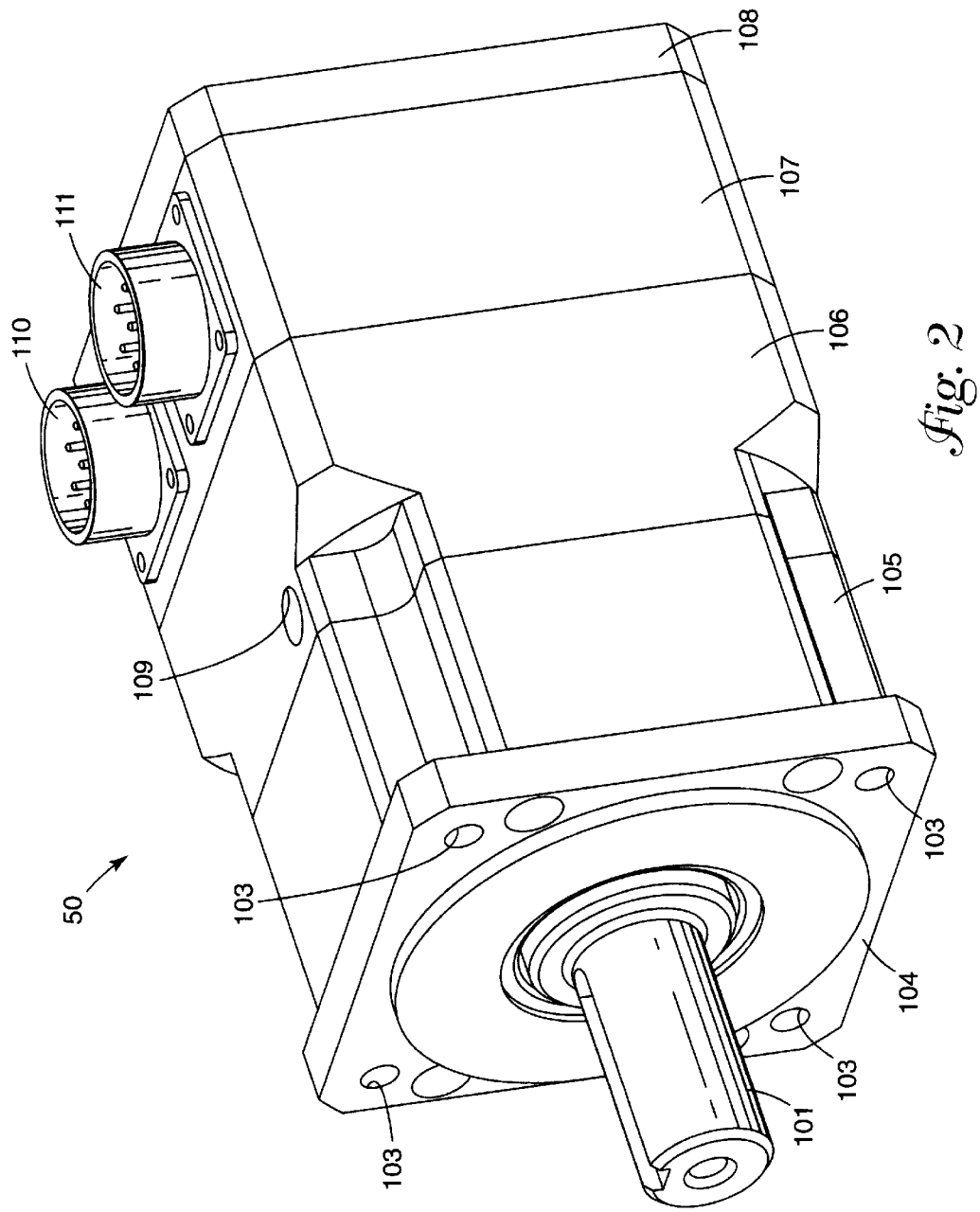
FIG. 2 is a perspective view of an integrated rotary servo actuator 50 constructed in accordance with the principles of the present invention.

Referring first to FIG. 2, a perspective view of a preferred integrated servo motor and gear head assembly (or integrated rotary servo actuator) constructed in accordance with the principles of the present invention is shown. The integrated rotary servo actuator 50 is generally designated at 50. For convenience, the integrated rotary servo actuator 50 may be referred to herein as actuator 50.

Figure 14:
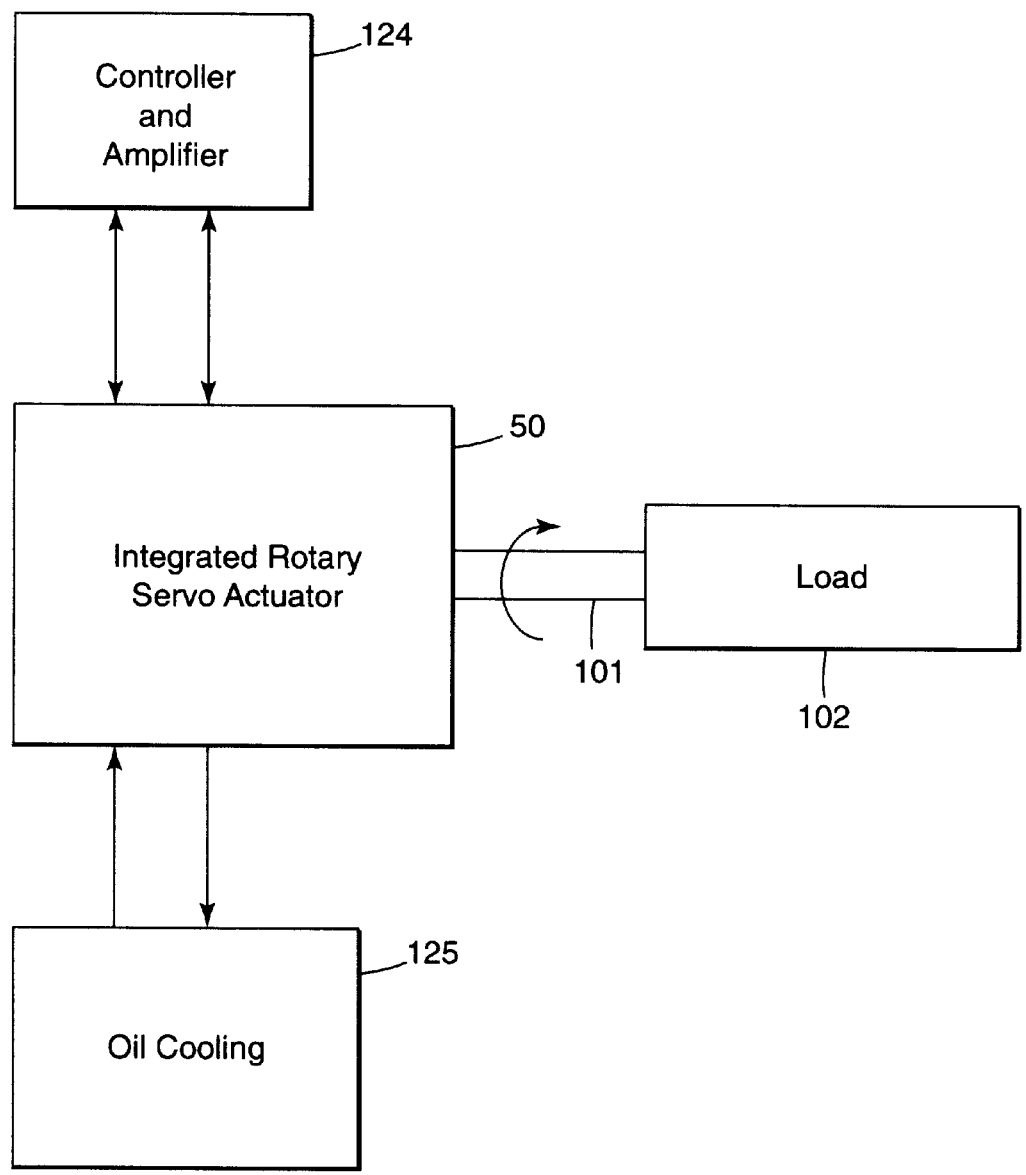
FIG. 14 illustrates the integrated rotary servo actuator in a representative environment in which a device constructed in accordance with the present invention might be employed.

Still referring to FIG. 2, actuator 50 includes a keyed output shaft 101 for providing power to the load (best seen in FIG. 14 at 102). As noted above, the load may be comprised of any number of various machine components. Through holes 103 are provided through front end plate 104 for mounting the actuator 50 in a working environment in a known manner. Three external housing components 105, 106 and 107 fit in a sealing engagement and house the gearhead assembly 51, motor stator 53, and feedback assembly 54, respectively, in a unitary housing. Back end plate 108 fits in sealing engagement with external housing component 107. Also visible in FIG. 2 is cooling oil port 109, feedback connector 110 and power connector 111.

Figure 3A:
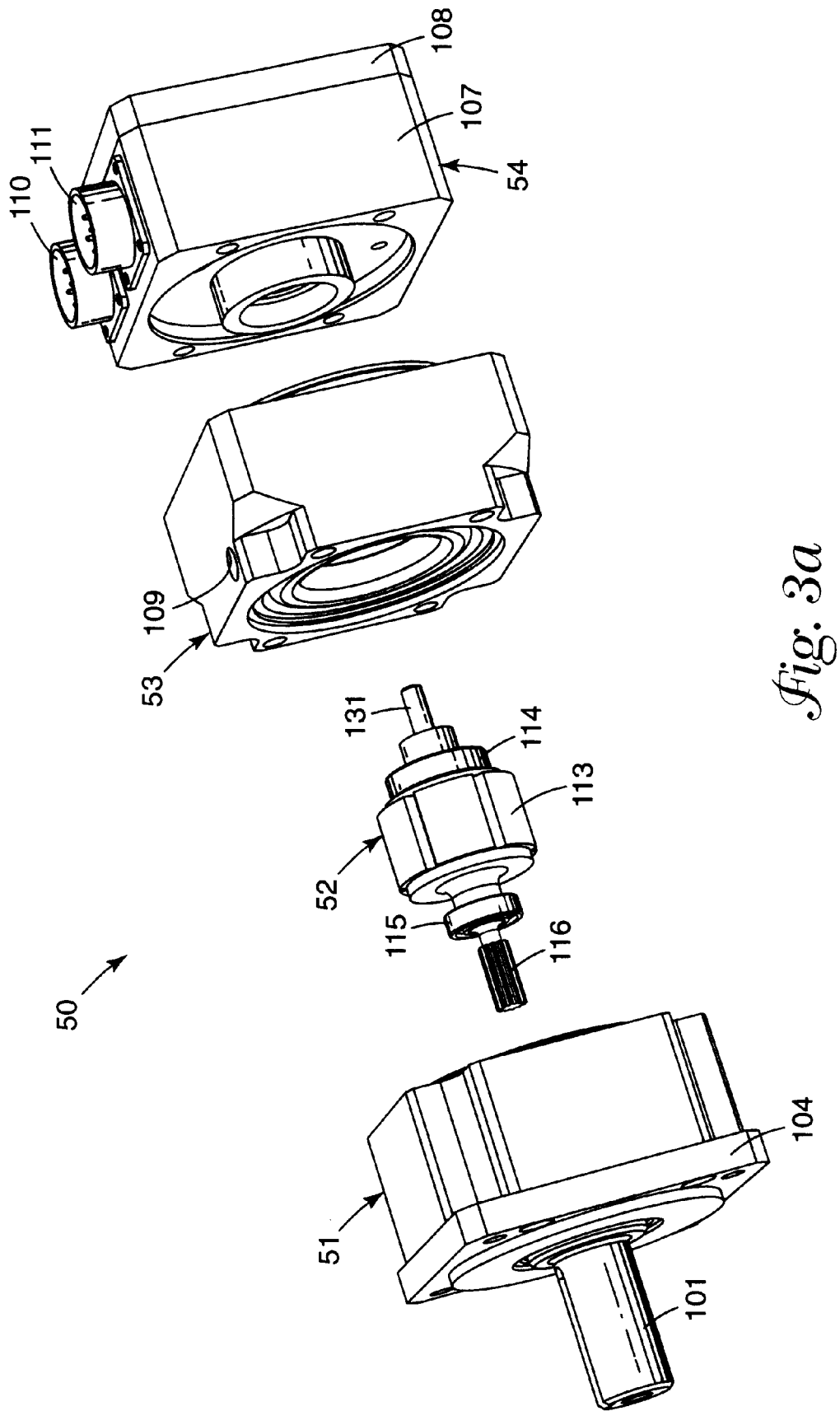
FIG. 3a is an exploded view of the four main sub assemblies of the integrated rotary servo actuator 50 of FIG. 2.
Figure 3B:
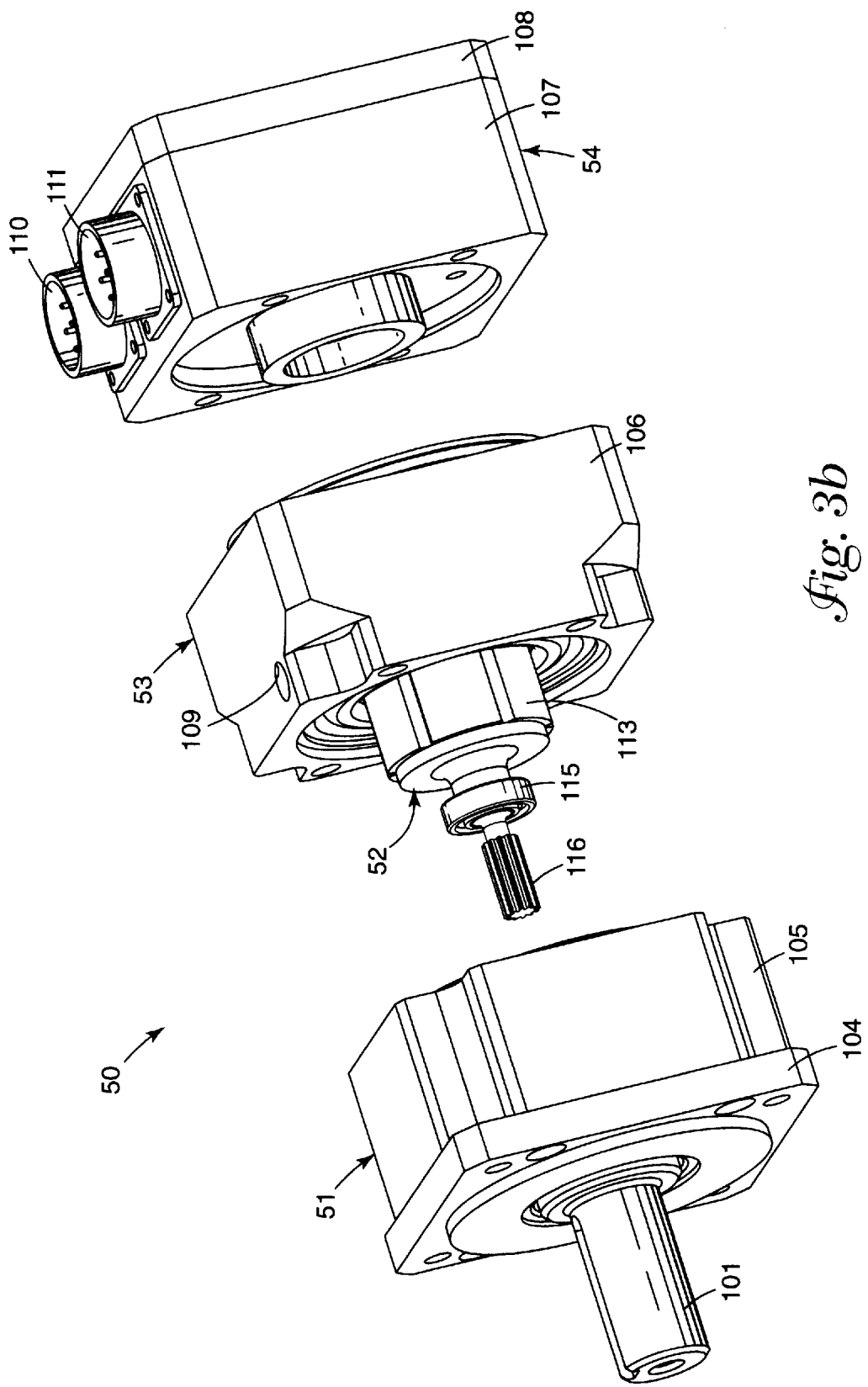
FIG. 3b is an exploded view of the four main sub assemblies of the integrated rotary servo actuator 50 of FIG. 2 with the rotor assembly 52 located in its operative position within the stator assembly 53.

Next referring to FIGS. 3a and 3b, the four main sub-assemblies of the actuator 50 are shown in a partially exploded form. The four sub-assemblies are the gearhead assembly 51, the motor rotor assembly 52, the motor stator assembly 53 and the feedback assembly 54. FIG. 3a illustrates the motor rotor assembly 52 out of its working position within the motor stator assembly 53, while FIG. 3b illustrates the motor rotor assembly within its working position (e.g., located within the stator).

Figure 4:
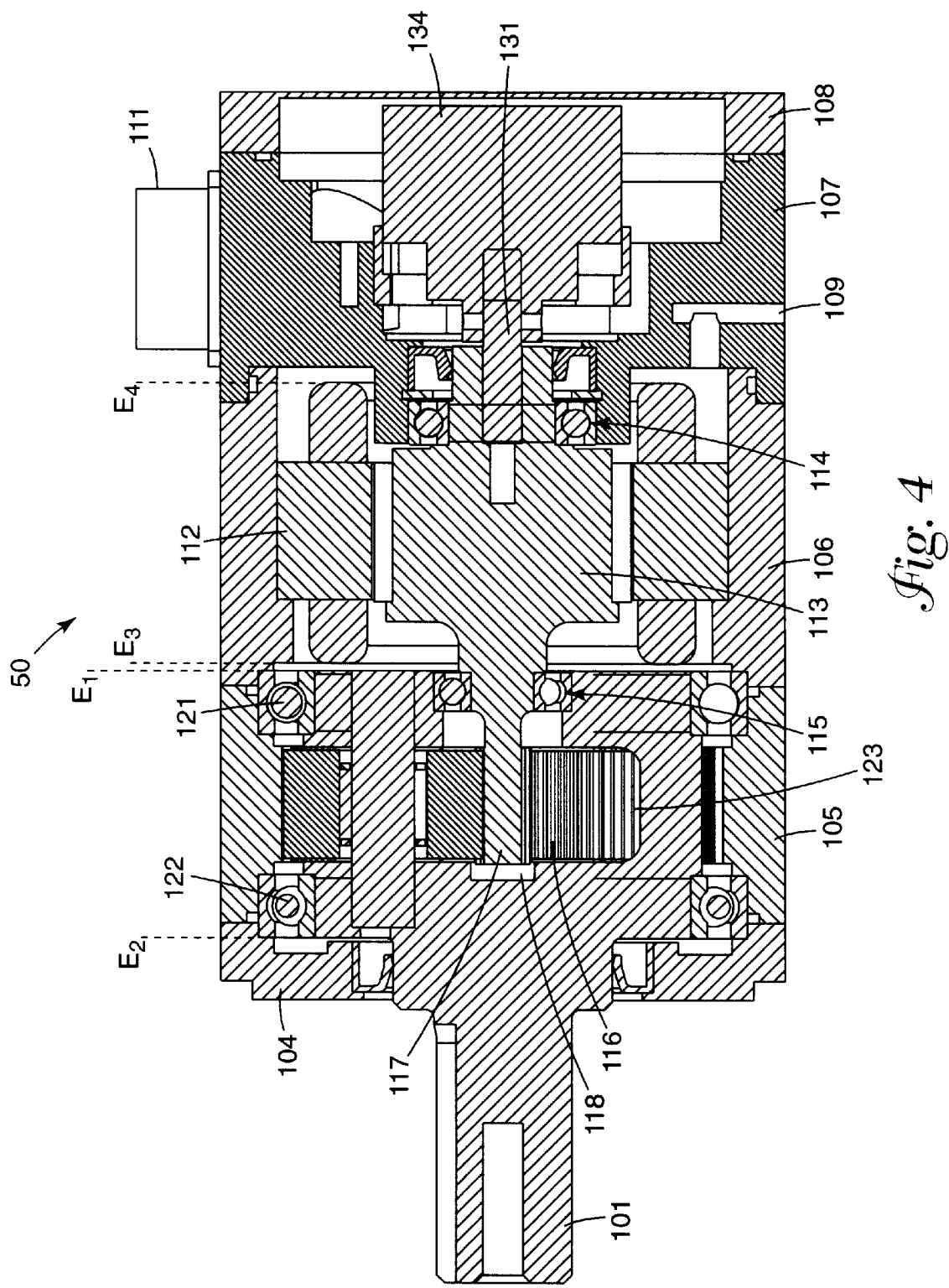
FIG. 4 is a schematic cross-sectional view of the exemplary integrated servo motor and gear head assembly 50 of FIG. 2.

FIG. 4 illustrates a schematic cross-sectional view of an integrated servo motor and gear head assembly 50 in accordance with the present invention. The integrated servo motor and gear head assembly 50 is fully contained within a single housing made up of the front end plate 104, gearhead housing 105, motor stator housing 106, feedback housing 107 and rear end plate 108. Located within the single housing are the four main subassemblies identified above.

Comprising the servo motor means (or prime mover) of the present invention are the motor stator assembly 53 and the motor rotor assembly 52. The motor means includes windings 112 and a rotor 113. In a preferred embodiment of the present invention, the motor means is a brushless permanent magnet motor optimized for compactness. Furthermore, the servo motor means can be selected to yield the highest possible power density available. For example, the servo motor means could use rare earth permanent magnets made of neodinium iron boron and wound with maximum slot fill. In a preferred embodiment of the present invention, only two bearings are used to support servo motor rotor 113. Servo motor rotor 113 is supported in the rear by rear motor bearing 114. Similarly, servo motor rotor 113 is supported at the front by front motor bearing 115. Rear shaft 131 is used for connecting an encoder (or other feedback device for closed loop operation of the actuator in combination with the controller block 124—best seen in FIG. 14).

The planetary gear assembly 51 is operatively connected to the servo motor rotor assembly 52 at its proximal end. Specifically, sun gear 116 is directly connected to rotor shaft 117, which is also connected to the servo motor rotor 113. Shaft 117 is a tapering shaft which can be inserted within the rotor motor 113 (best seen in FIGS. 12a and 12b). Tapering shaft 117 is self-locking. Bolt 118 secures sun gear 116 within servo motor rotor 113.

Since the sun gear and the motor rotor are constructed from the same material, selection of the material from which the components are constructed is important. For example, the materials must provide a high quality, high strength gear, and also needs to provide good magnetic properties to provide a proper magnetic field under the motor magnets. In the present case, an alloy of stainless steel has demonstrated the required characteristics. Preferably the stainless steel is 17–4 Ph.

In addition to supporting motor rotor 113, front motor bearing 115 also supports sun gear shaft 117 (this bearing may also be referred to as the sun gear bearing herein). Thus, front motor bearing 115 serves as an accurate means of locating planet carrier 119 by fixing the center of location of sun gear 116 within the planetary gear system 120 (best seen in FIGS. 6a, 8, and 9). Furthermore, this reduces the loss of power transmission from servo motor means to the planetary gear system 51 and increases the bearing life of front motor bearing 115.

More specifically, the bearing life of the front motor bearing 115 is increased since the outer race is not fixed, but rotates with the planet carrier. Since the planet carrier rotates the same direction as the motor rotor shaft, the relative rotational speed of this bearing is less than if it was mounted in a bulkhead or faceplate of a conventional motor. Because it is rotating slower, it has a longer life.

To further reduce the size of the integrated servo motor and gear head assembly 50 in the axial direction, servo motor stator windings 112 are configured such that rear motor bearing 114 supports the motor rotor 113 within the stator windings 112 as shown in FIG. 4. In other words, the bearing 114 is positioned between a front edge $E_3$ of the stator windings 112 and a rear edge $E_4$ of the windings 112. In a conventional motor, the rear motor bearing support is axially positioned beyond (or rearward of) the point where the stator windings are located. However, in a preferred embodiment of the present invention, the diameter of rotor motor 113 is purposely increased. Likewise, the inside diameter of stator windings 112 is also increased. In so doing, adequate radial space is present within stator windings 112 to receive rear motor bearing 114 and support motor rotor 113. This configuration can significantly reduce the axial length of the overall assembly. For example, in the case of a NEMA size 34 device, this saves approximately ½" of length, or approximately 5–10% of the overall length of the entire configuration.

Planet carrier assembly 51 has a fully supported design. As noted above, preferred embodiments constructed in accordance with the principles of the present invention are fully supported with large diameter bearings 121 and 122 on both sides (e.g., axially) of the planet gears 123. Further, the sun gear bearing 115 is arranged and configured to lie axially within the fully supported planet carrier. In other words, the bearing 115 is positioned between an rear edge $E_1$ of the bearing 121 and a front edge $E_2$ of the dearing 122. By locating the planet carrier in this manner, the carrier has the responsibility of providing the bearing alignment accuracy for a total of three bearings (e.g., the two planet carrier bearings 121, 122 and the sun gear bearing 115). This leads to a high accuracy gear head since a single component aligns all three bearings. Possible misalignment of that component to the planet carrier is possible in other designs because other gear heads use a separate component to mount the sun gear bearing. Although there may be some cantilevered planet carriers that mount the sun gear within the planet carrier.

The present design further reduces the axial length of the overall assembly design. For example, in a conventional modular gear head and motor combination such as a NEMA standard size 34 frame, these same two bearings would be axially separated by a distance of typically several inches. Thus, the present invention reduces the overall size by 10–20% of the entire length of a conventional modular gear head and motor combination.

In another embodiment of the present invention, the housing is completely sealed. Additionally, the housing is provided with input port 109 and an output port (also designated 109 and best seen in FIGS. 4 and 13). Thus, all of the moving components within the actuator 50 can be effectively lubricated and cooled with a simple low pressure oil circulation system (best seen in FIG. 14 at block 125). In a conventional gear head and motor assembly, this type of lubrication cannot be accomplished. Thus, the present invention is able to operate at greatly increased power levels. For example, the integrated rotary servo actuator 50 can continuously produce three times the torque at the same speeds as compared with the conventional motor and gear head combination. Additionally, effective lubrication extends the life of the moving components of the assembly. Thus, the present invention also provides for a more cost-efficient servo motor and gear head assembly as compared to conventional gear head and motor combinations.

Figure 6C:
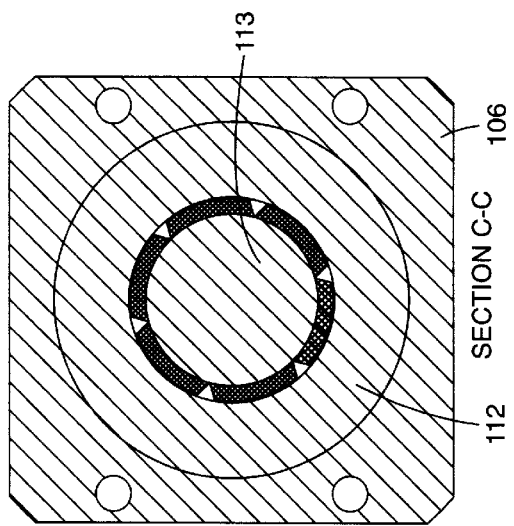
FIG. 6c is a cross section view of the integrated rotary servo actuator 50 of FIG. 5 taken through line 6c–6c.
Figure 6B:
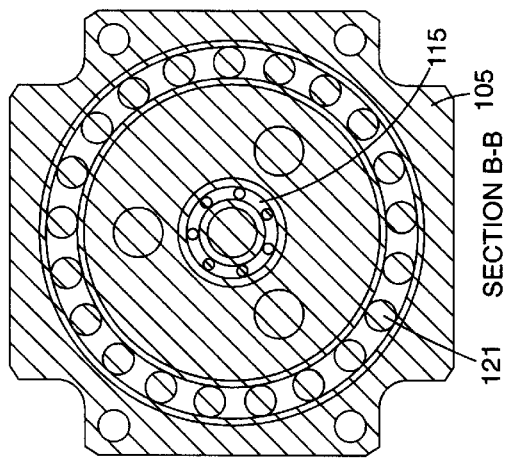
FIG. 6b is a cross section view of the integrated rotary servo actuator 50 of FIG. 5 taken through line 6b–6b.
Figure 6A:
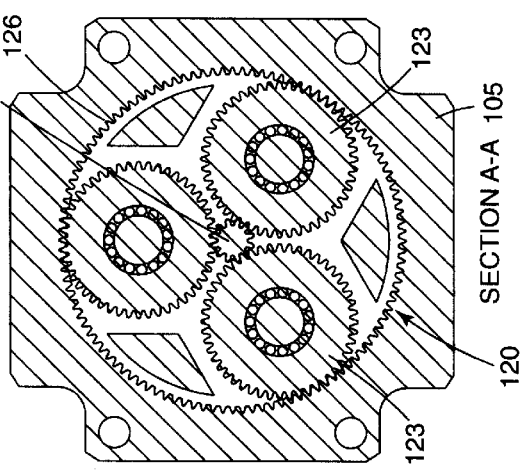
Figure 5:
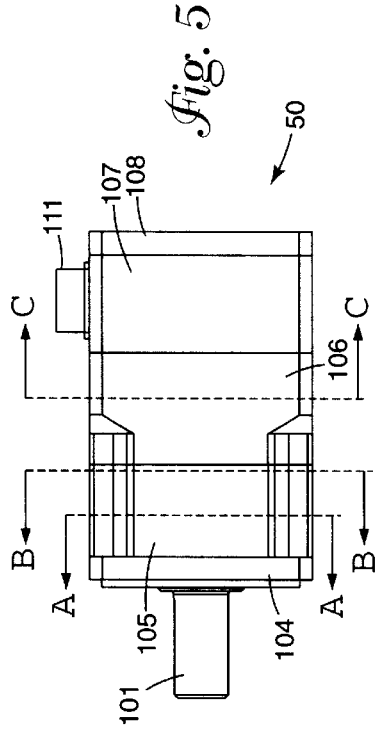
FIG. 5 is an elevated side view of the integrated rotary servo actuator 50 of FIG. 2.

FIGS. 5, 6a, 6b, and 6c, illustrate cross sectional views taken at different points along the longitudinal axis of the integrated rotary servo actuator 50. FIG. 6a illustrates the arrangement and configuration of the sun gear 116, the planet gears 123, and the outer ring gear 126. FIG. 6b illustrates the location of the sun gear bearing 115 as being within or proximately within the bearing 121. FIG. 6c illustrates the location of the rotor 113 within the stator 112.

Figure 7:
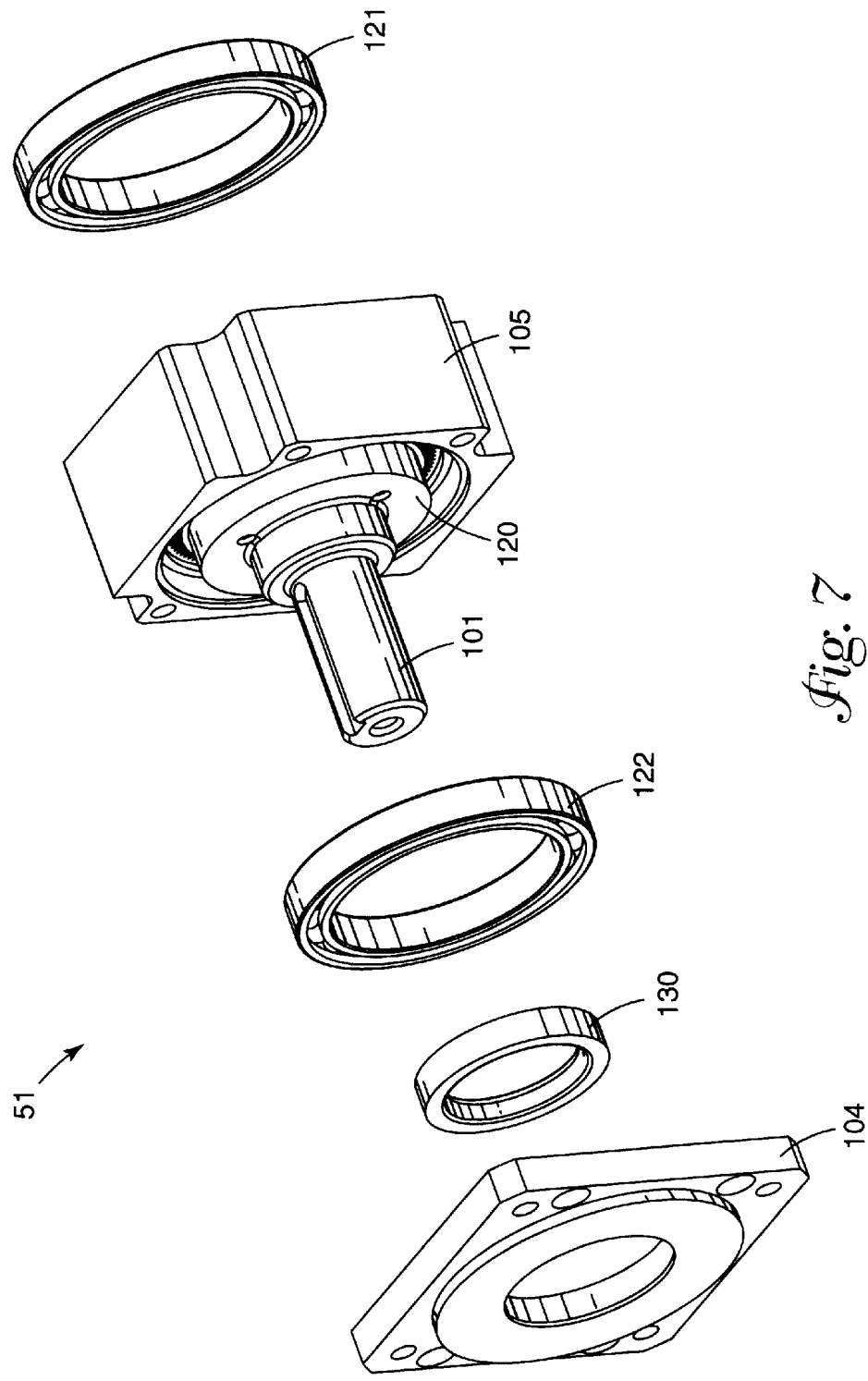
FIG. 7 is an exploded view of the gearhead assembly 51 of the integrated rotary servo actuator of FIG. 2, with the sun and planet gears assembled.
Figure 8:
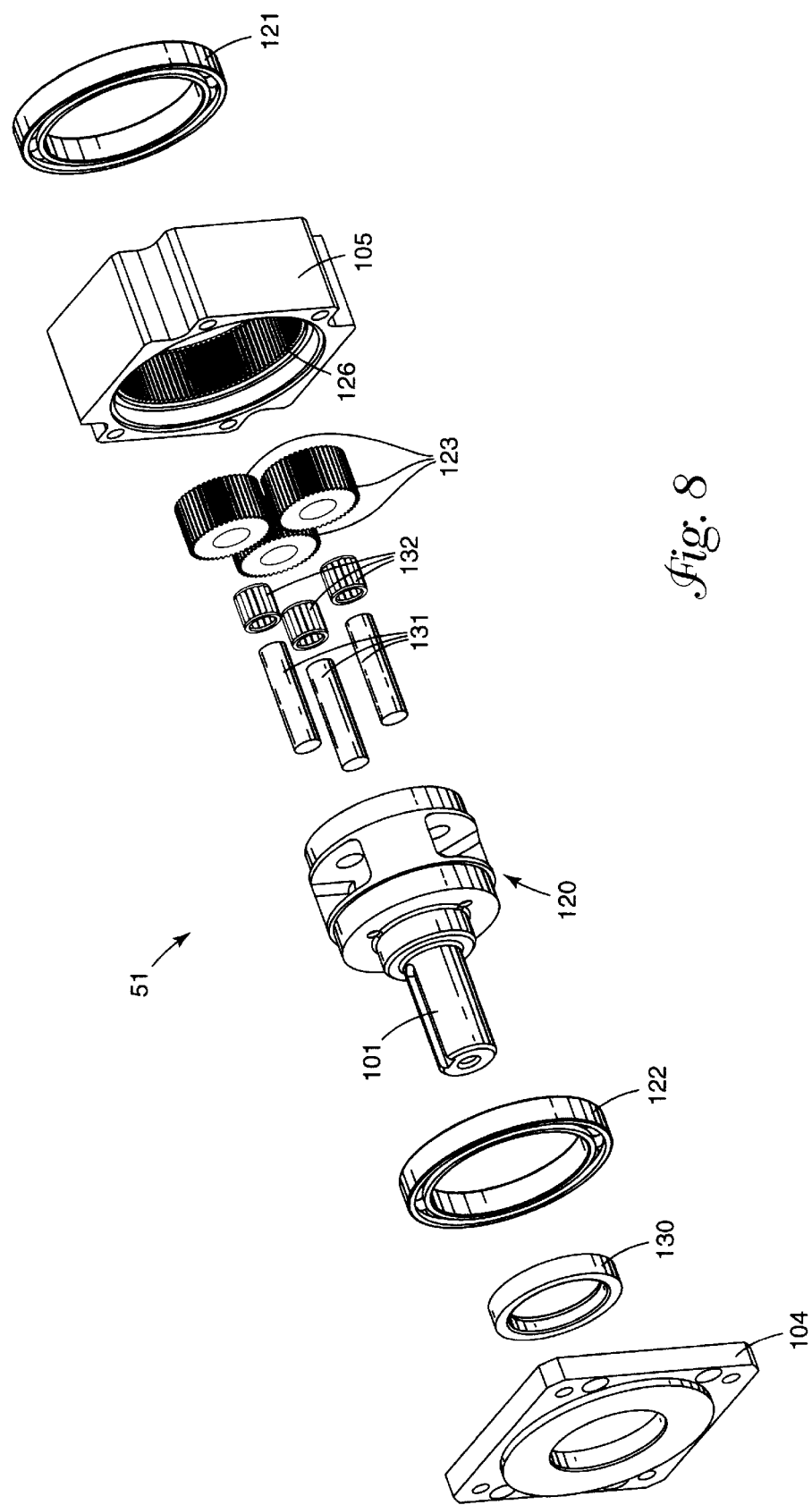
FIG. 8 is an exploded view of the gearhead assembly 51 of FIG. 7 with the sun and planet gears exploded.

FIGS. 7 and 8 illustrate exploded views of the gearhead assembly 51 and the front end plate 104. The location of the bearings 121 and 122, as well as the location of the front oil seal 130 are illustrated in FIG. 7, while the planetary gear carrier 120 is shown in its operative position within the ring gear 126. FIG. 8 illustrates the planetary gear carrier 120 taken out of the operative position and to show the various elements of carrier 120. More specifically, planet pins 131 are located within caged needle bearings 132, which are then located within the planet gears 123.

Figure 9:
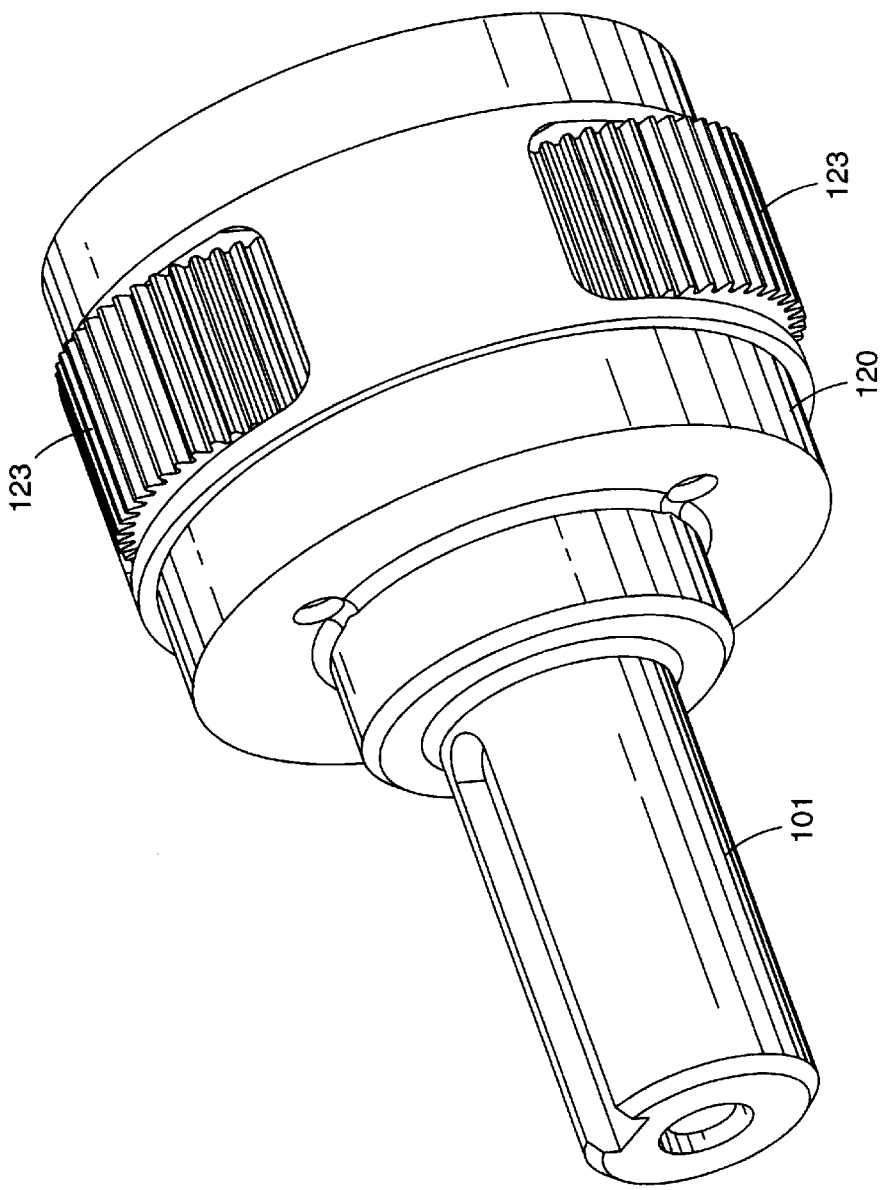
FIG. 9 is a perspective view of the planet gear carrier 120.
Figure 10:
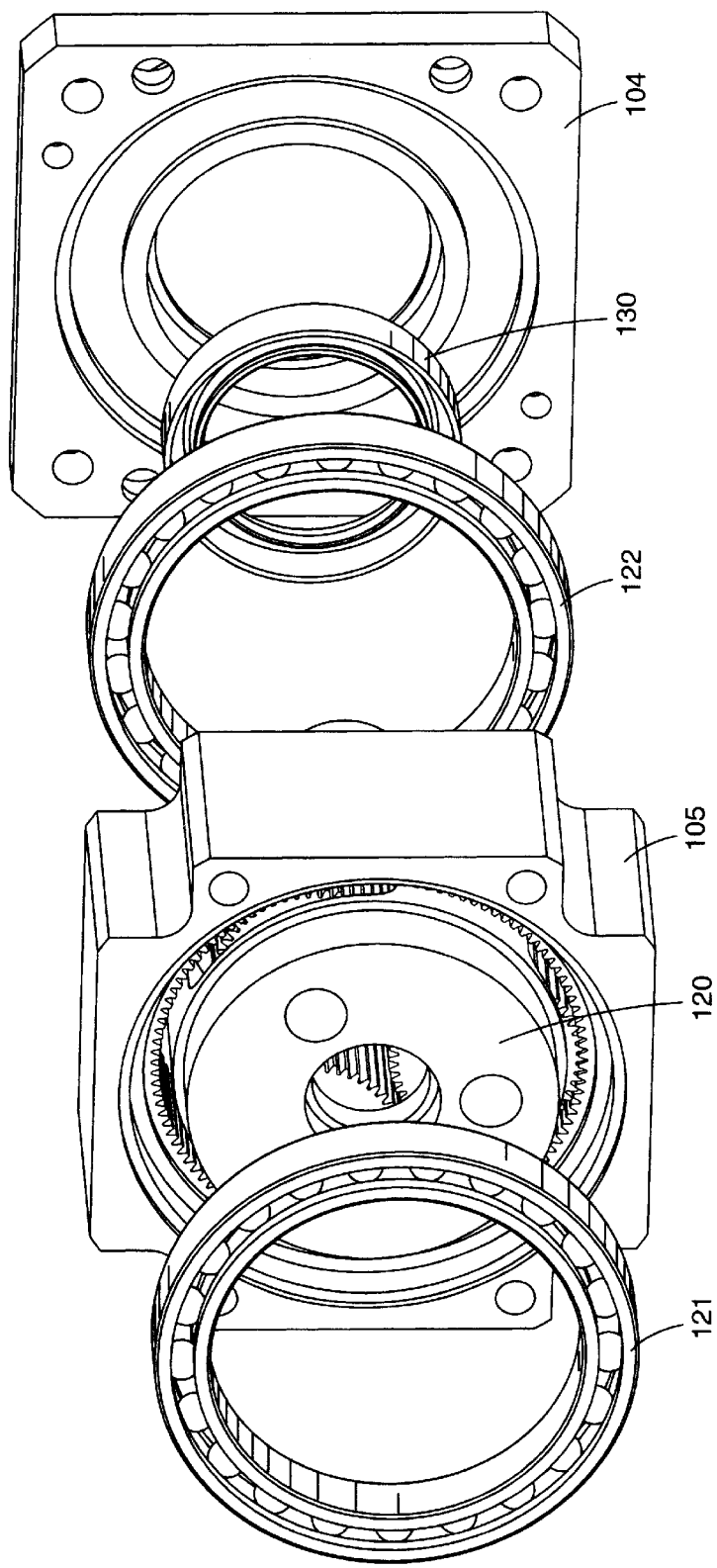
FIG. 10 is a perspective view of a partially exploded gearhead assembly 51 taken from the rear and left-side.

FIG. 9 shows an enlarged perspective view of the planet carrier device 120 with the planet gears 123 mounted therein and the integral output shaft 101. FIG. 10 is an exploded perspective view from the back or rear of the actuator 50. This view also shows the location of the bearings 121 and 122 on opposing sides of the planet carrier 120 in order to support the planet carrier. As indicated above, by straddling the planet gears 123, the shaft side load on the actuator 50 is improved.

Figure 11:
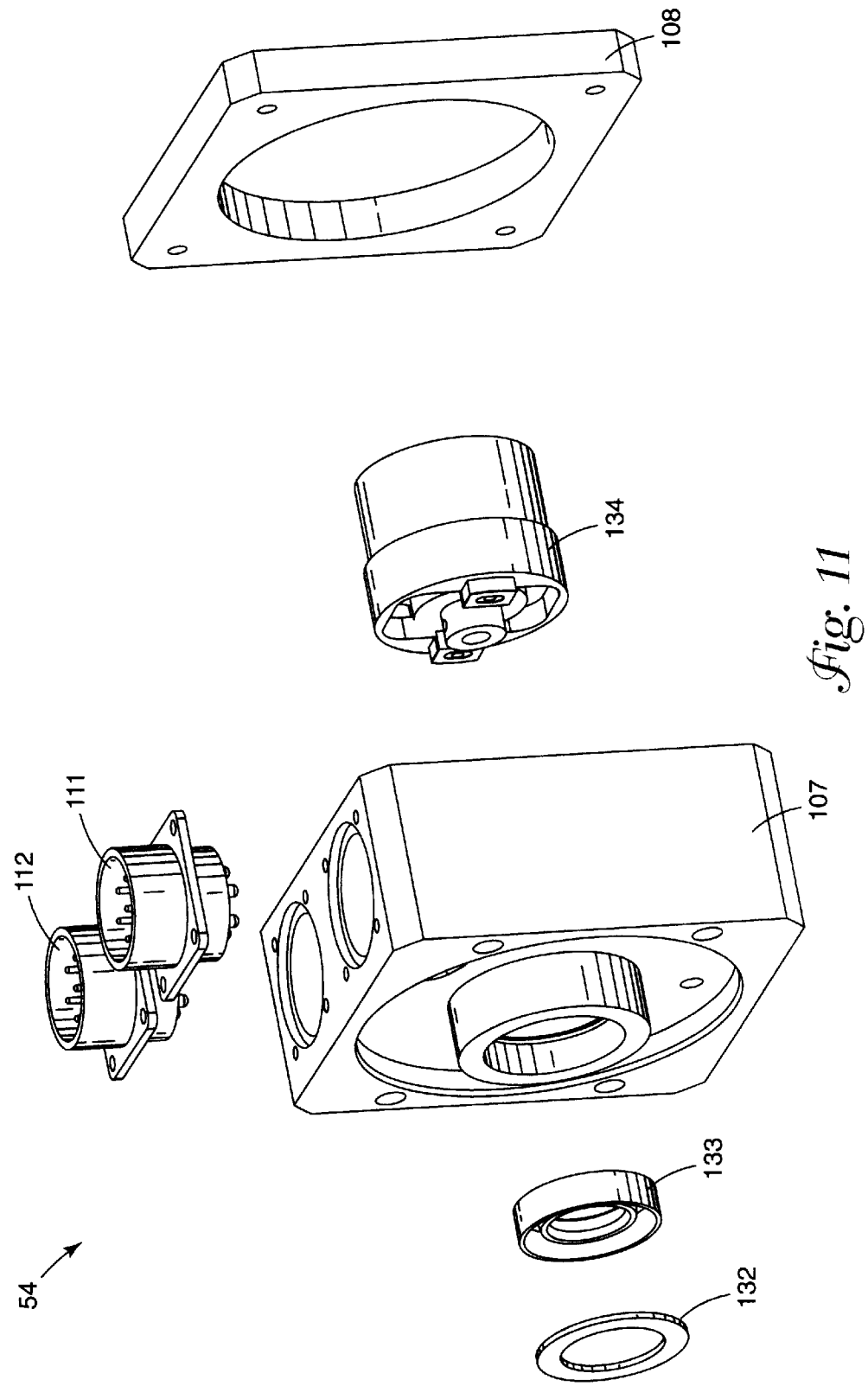
FIG. 11 is a partially exploded view of the feedback assembly housing 54 of the integrated rotary servo actuator of FIG. 2.

FIG. 11 is an exploded view of the feedback assembly 54 and the back end plate 108. The location of encoder 134, electrical connections 112 (feedback connector from the encoder to the controller 124) and 111 (providing power from the amplifier 124 to the windings 112), snap ring 132, and rear oil seal 133 are all illustrated.

Alternative Embodiments

Figure 12B:
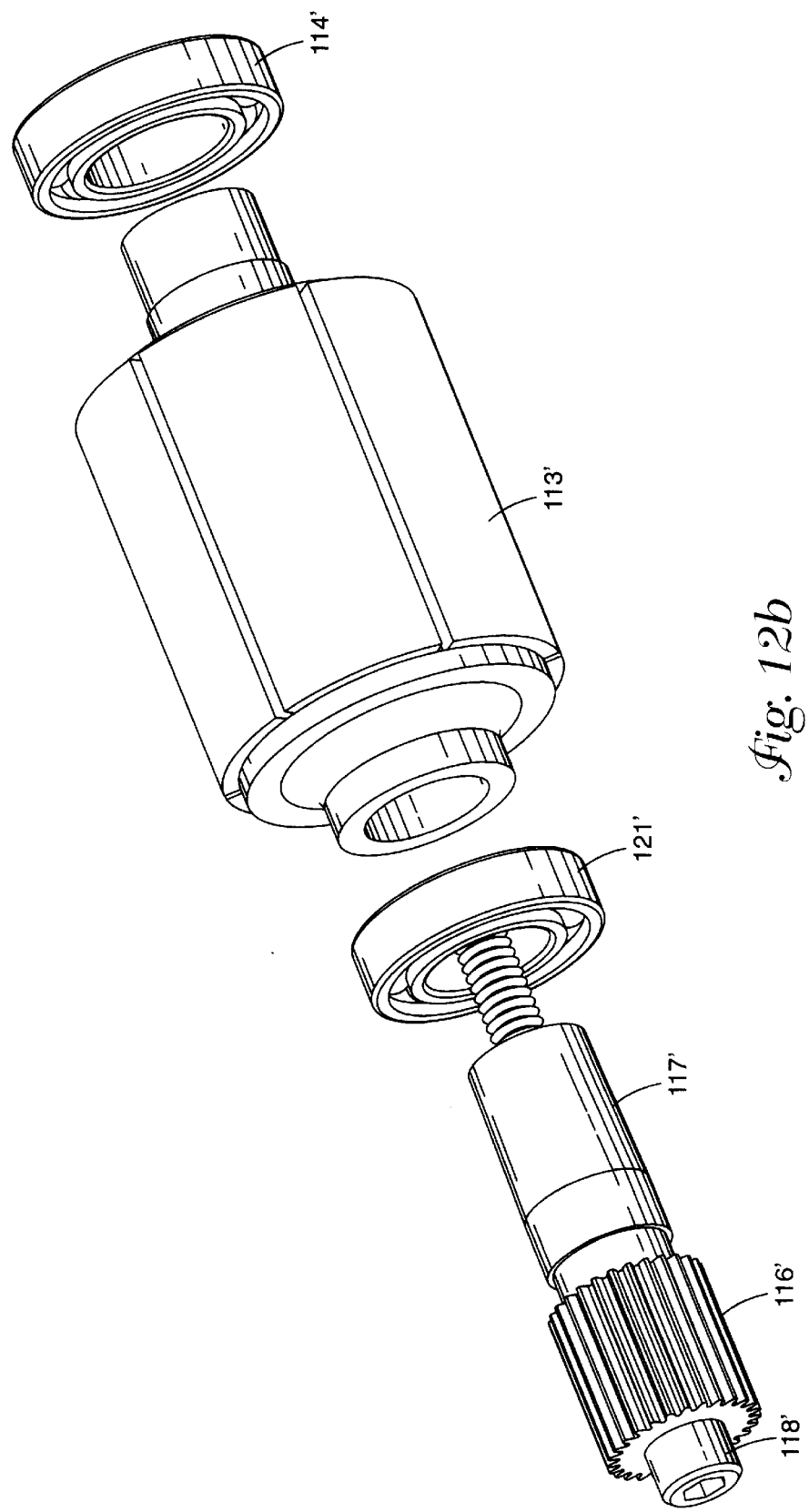
Figure 13:
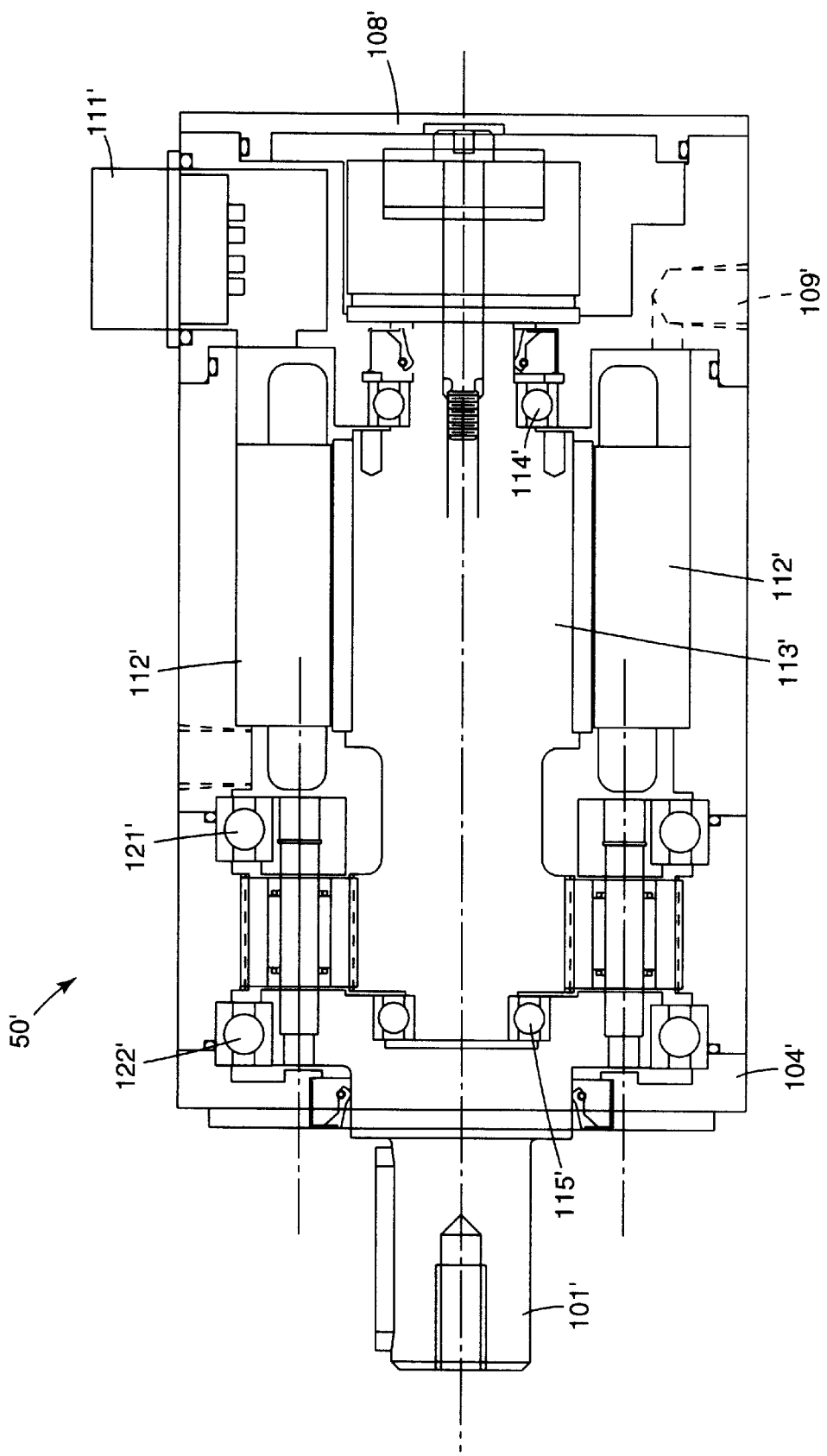
FIG. 13 is a schematic cross sectional view of a second alternative embodiment integrated rotary servo actuator.

FIGS. 12a, 12b and 13 illustrate alternative embodiments of an actuator 50' constructed in accordance with the principles of the present invention. Since the various parts illustrated in these drawings are similar to the parts identified above, the parts are represented by similar part numbers with a following prime designation. These schematic drawings illustrate that the locations of the various bearings may slightly differ from the embodiment described in detail above without departing from the principles of the present invention. For example, each of FIGS. 12a and 13 illustrate that larger bearings 121' and 122' straddle the planet carrier 120'. Similarly, the sun gear bearing 115' is located axially (or longitudinally) at the same point to be approximately concentric with the larger bearing 121' (or 122'). Still further, the rear rotor bearing 114' is located within the physical area axially (or longitudinally) as the windings 112'.

In view of the foregoing embodiments, it will be appreciated that different approaches for mounting the sun gear bearing may be used. For example, the bearing may be located on the rotor side of the sun gear or located on the output shaft side of the sun gear. In some instances, the placement of the sun gear bearing may provide for manufacture of an integral rotor and sun gear (e.g., the embodiment shown in FIG. 13). In each case, however, the sun gear bearing is kept axially within the planet carrier. It will also be appreciated that moving the sun gear bearing to a location approximately within the planet carrier and moving the rear rotor bearing to a location approximately within the windings should be included within the scope of the present invention.

As noted above, the present invention is applicable to a number of different embodiments for a fully integrated servo motor and gear head assembly. Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

What is claimed is:

1. An integrated rotary servo actuator apparatus, comprising:
    a) a rotor having a rotor shaft;
    b) a stator;
    c) a planetary gear system, including a sun gear, a plurality of planet gears and an outer ring gear, wherein the sun gear is directly connected to said rotor shaft and an output shaft is connected to said planet gears;
    d) first and second bearings for supporting said planetary gear system, said first and second bearings located on opposing sides of said planetary gear system, and said first bearing has a first diameter and said second bearing has a second diameter; and
    e) a third bearing for supporting said rotor shaft, wherein said third bearing has a third diameter, said third diameter is less than said first and second diameters, and wherein said third bearing is positioned between an edge of the first bearing and an edge of the second bearing.

2. The apparatus of claim 1, wherein said third bearing and said second bearing have a common center.

3. The apparatus of claim 1, wherein said third bearing and said first bearing have a common center.

4. The apparatus of claim 1, wherein said third bearing has a common center with said first or second bearing.

5. The apparatus of claim 1, wherein said stator includes a plurality of windings; and further comprising: a fourth bearing to support said rotor; said fourth bearing being positioned between edges of said windings.

6. The apparatus of claim 1, further comprising:
    a) a housing for said rotor and said planetary gear system, said housing having an inlet and an outlet port; and
    b) fluid cooling means in fluid communication with said inlet and said outlet port, wherein a fluid is circulated through said housing to remove heat energy.

7. The apparatus of claim 6, wherein the fluid is an oil.

8. The apparatus of claim 7, wherein said rotor further includes a rear shaft, and further comprising oil seals located about said output shaft and said rear shaft.

9. The apparatus of claim 1:
    a) wherein said third bearing is generally concentric with said first or second bearing;
    b) wherein said stator includes a plurality of windings; and further comprising: a fourth bearing to support said rotor; said fourth bearing being positioned between edges of said windings; and
    c) further comprising:
        i) a housing for said rotor and said planetary gear system, said housing having an inlet and an outlet port; and
        ii) fluid cooling means in fluid communication with said inlet and said outlet port, wherein a fluid is circulated through said housing to remove heat energy.

10. The apparatus of claim 1, wherein said rotor further includes a rear shaft, and further including an encoder operatively connected to said rear shaft for providing a position signal for said rotor shaft.

11. An apparatus for providing rotary movement to a load, comprising:
    a) a housing;
    b) a prime mover, located within said housing, and having a rotor shaft;
    c) a planetary gear system directly connected to said prime mover within said housing, said planetary gear system having a sun gear mounted directly on said rotor shaft and a plurality of planet gears carried in a planet gear carrier;

d) first and second bearings mounted on opposing sides of said planet gear carrier, and said first bearing has a first diameter and said second bearing has a second diameter; and e) a third bearing for supporting said rotor shaft and said sun gear, wherein said third bearing has a third diameter, said third diameter is less than said first and second diameters, and wherein said third bearing is positioned between an edge of the first bearing and an edge of the second bearing.

12. The apparatus of claim 11, wherein said prime mover includes a plurality of windings forming a stator and a rotor.

13. The apparatus of claim 12, further comprising a fourth bearing for supporting the rotor, and the fourth bearing is positioned between edges of said stator.

14. The apparatus of claim 13, wherein said rotor includes a rear shaft and further comprising an encoder connected to said rear shaft for providing a position signal for said rotor.

15. An apparatus for providing rotary movement to a load, comprising:

a) a housing;

b) a servo motor located within said housing, said servo motor having a rotor with a rotor shaft;

c) gear reducing means, directly connected to said servo motor within said housing, for providing increased torque to a load;

d) first and second bearings mounted on opposing sides of said gear reducing means, and said first bearing has a first diameter and said second bearing has a second diameter; and e) a third bearing for supporting said rotor shaft and a portion of said gear reducing means, wherein said third bearing has a third diameter, said third diameter is less than said first and second diameters, and wherein said third bearing is positioned between an edge of the first bearing and an edge of the second bearing.

16. The apparatus of claim 15, wherein said servo motor includes a stator with a plurality of windings; and further comprising: a fourth bearing to support said rotor; said fourth bearing is positioned between edges of said windings.

17. The apparatus of claim 15 wherein said housing includes an inlet and an outlet port; and further comprising fluid cooling means in fluid communication with said inlet and said outlet port, wherein a fluid is circulated through said housing to remove heat energy.

18. The apparatus of claim 17, wherein the fluid is an oil.

* * * * *